(12) United States Patent
Pogorelik (10) Patent No.: US 10,706,318 B2
(45) Date of Patent: Jul. 7, 2020

(54) SYSTEMS, APPARATUS, AND METHODS TO IMPROVE OBJECT RECOGNITION

(71) Applicant: Intel Corporation, Santa Clara, CA (US)

(72) Inventor: Oleg Pogorelik, Lapid (IL)

(73) Assignee: INTEL CORPORATION, Santa Clara, CA (US)

(*) Notice: Subject to any disclaimer, the term of this patent is extended or adjusted under 35 U.S.C. 154(b) by 42 days.

(21) Appl. No.: 15/839,672

(22) Filed: Dec. 12, 2017

(65) Prior Publication Data

US 2019/0050670 A1    Feb. 14, 2019

(51) Int. Cl.
*G06K 9/00* (2006.01)
*G06K 9/62* (2006.01)
(Continued)

(52) U.S. Cl.
CPC ....... *G06K 9/6202* (2013.01); *G06F 16/2455* (2019.01); *G06K 7/10722* (2013.01);
(Continued)

(58) Field of Classification Search
CPC .............. G06K 9/6202; G06K 9/6267; G06K 9/00664; G06K 9/3241; G06K 9/4628; G06K 9/629; G06K 9/00201; G06K 9/4676; G06K 9/00127; G06K 9/00147; G06K 9/00181; G06K 9/00228; G06K 9/00268–00295; G06K 9/00369; G06K 9/00456; G06K 9/00523; G06K 9/00536; G06K 9/00496; G06K 9/00711; G06K 9/00718; G06K 9/6201; G06K 9/6207; G06K 9/6209; G06K 9/621; G06K 9/6211; G06K 9/6212; G06K 9/6215; G06K 9/6217; G06K 9/6218; G06K 9/6219; G06K 9/6226; G06K 9/6227; G06K 9/6229; G06K 9/623; G06K 9/6232; G06K 9/6234; G06K 9/6255; G06K 9/626; G06K 9/6269; G06K 9/627; G06K 9/6271; G06K 2009/6213; G06K 2009/6864; G06K 2009/6871; G06K 7/1482; G06K 9/6276–6297; G06T 7/00–194; G06T 9/002; G06T 2207/10016; G06T 2207/20016; G06T 2207/20084; G06T 2207/20081; G06T 2207/20076; G06T 2207/30164; G06F 16/2455; G06F 16/14; G06F 16/144; G06F 16/24–2477; G06F 16/33–337;
(Continued)

(56) References Cited

U.S. PATENT DOCUMENTS

7,668,797 B2 * 2/2010 Kuvich ................ G06K 9/4628
700/245
9,384,619 B2 * 7/2016 Erol .................... G06K 9/00221
(Continued)

*Primary Examiner* — Jose L Couso
(74) *Attorney, Agent, or Firm* — Hanley, Flight & Zimmerman, LLC (57) ABSTRACT

Methods, apparatus, systems, and articles of manufacture are disclosed to improve robot object recognition. An example apparatus includes a visual object recognizer to obtain a visual identifier associated with a target object, and a recognizable object model generator to generate a model of the target object based on mapping an image of the target object to classifier information corresponding to the visual identifier.

20 Claims, 6 Drawing Sheets

(51) Int. Cl.
*G06K 19/06* (2006.01)
*G06K 7/14* (2006.01)
*G06K 7/10* (2006.01)
*G06F 16/2455* (2019.01)
*G06K 9/46* (2006.01)
*G06K 9/18* (2006.01)

(52) U.S. Cl.
CPC ......... *G06K 7/1413* (2013.01); *G06K 7/1417* (2013.01); *G06K 9/00624* (2013.01); *G06K 9/00979* (2013.01); *G06K 9/18* (2013.01); *G06K 9/46* (2013.01); *G06K 9/6267* (2013.01); *G06K 19/06028* (2013.01); *G06K 19/06037* (2013.01)

(58) Field of Classification Search
CPC ..... G06F 16/43–437; G06F 16/53–535; G06F 16/63–637; G06F 16/73–735; G06F 16/83–8373; G06F 16/903–9035; G06F 11/1476; G06F 11/2263; G06F 17/30477; G06F 17/50; G06F 2207/4824; G06N 3/049; G06N 3/008; G06N 3/0409; G06N 3/02; G06N 3/04; G06N 3/08–12; G06N 5/00–048; G06N 7/00–08; G06N 20/00–20; Y10S 901/44; Y10S 901/47
See application file for complete search history.

(56) References Cited

U.S. PATENT DOCUMENTS

| | | | |
|---|---|---|---|
| 10,318,848 B2 * | 6/2019 | Dijkman | G06K 9/4628 |
| 10,380,461 B1 * | 8/2019 | Ravichandran | G06K 9/6267 |
| 2008/0144943 A1 * | 6/2008 | Gokturk | G06K 9/46 382/224 |
| 2012/0128241 A1 * | 5/2012 | Jung | G06K 9/00711 382/165 |
| 2012/0210233 A1 * | 8/2012 | Davis | G06Q 30/0201 715/727 |
| 2013/0273968 A1 * | 10/2013 | Rhoads | G06K 9/6253 455/556.1 |
| 2013/0339039 A1 * | 12/2013 | Roman | G06Q 50/22 705/2 |
| 2016/0283595 A1 * | 9/2016 | Folkens | G06F 3/013 |
| 2017/0249745 A1 * | 8/2017 | Fiala | A63F 13/65 |
| 2018/0060359 A1 * | 3/2018 | Li | G06F 16/5866 |
| 2018/0189325 A1 * | 7/2018 | Hohwald | G06F 3/04817 |
| 2018/0350144 A1 * | 12/2018 | Rathod | H04W 4/029 |
| 2019/0087975 A1 * | 3/2019 | Versace | G06K 9/00664 |
| 2019/0095467 A1 * | 3/2019 | Kislyuk | G06F 16/5838 |
| 2019/0319706 A1 * | 10/2019 | Aliakseyeu | G06T 7/74 |
| 2019/0362516 A1 * | 11/2019 | Suzuki | G02B 27/017 |

* cited by examiner

SYSTEMS, APPARATUS, AND METHODS TO IMPROVE OBJECT RECOGNITION

FIELD OF THE DISCLOSURE

This disclosure relates generally to object recognition and, more particularly, to systems, apparatus, and methods to improve object recognition.

BACKGROUND

In recent years, object recognition systems are being deployed in an array of applications and corresponding devices. Devices such as domestic robots or personal robots can use an object recognition system to aid in household tasks such as cleaning, cooking, and childcare as well as to provide social interactions with residence inhabitants. Vehicles such as automobiles and unmanned aerial vehicles can use object recognition systems to identify encountered objects to assist in navigation and complete maneuvering operations.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Object recognition systems are being increasingly utilized to identify objects captured by a visual imaging system. Object recognition systems are being used in a variety of applications ranging from autonomous vehicle operation to security surveillance systems. In some examples, devices such as mobile devices, tablet computers, etc., use an object recognition system to identify an object to perform a software-based operation. In some examples, vehicles such as automobiles and unmanned aerial vehicles use an object recognition system for object avoidance, navigation, and/or maneuvering operations.

In some examples, an object recognition system is used by a device such as a domestic robot, sometimes referred to as an in-house robot, a personal robot, or a social robot. For example, the domestic robot can be a mobile machine capable of assisting an individual with a household task such as cleaning, cooking, and object retrieval. Typically, a domestic robot can move autonomously within an area using tracks or wheels and, in some examples, can grip, rotate, and manipulate an object using a mechanical arm operatively coupled to a hand-like gripper. For example, a human user can command a domestic robot to pick up a coffee cup from a table and place the coffee cup into a kitchen sink. In response to the command, the domestic robot can move from a current position to a position proximate the table, scan the table for the coffee cup using an object recognition system, and grab the coffee cup in response to identifying the coffee cup using the object recognition system.

In some examples, an object recognition system identifies an object such as a coffee cup by capturing and processing an image of the object. For example, an object recognition system may include a camera-based image processing system that can capture still-images or video of an object and translate the still-images or video into a computer-based model of the object. The object recognition system may generate the computer-based model of the object by a computer vision technique such as an appearance-based method or a feature-based method. In some examples, the object recognition system identifies the object by comparing the computer-based model of the object to a baseline or a reference computer-based model included in a database communicatively coupled to the object recognition system. In some examples, the object recognition system generates a reference computer-based model in response to unsuccessfully identifying the object using existing reference computer-based models.

Techniques to generate reference computer-based models in devices such as mobile devices, vehicles, domestic robots, etc., using appearance-based methods have been attempted in the past. For example, an object recognition system can use an appearance-based method to compare detectable features included in an image of a target object to detectable features corresponding to template objects stored in a database to determine a match. However, the target object may look completely different depending on lighting conditions, an angle or a distance from which the target object is viewed, etc. As a result, object recognition systems employing an appearance-based method may need to have a substantially large base of templates to use as a base of comparison for target object images to account for such environmental or image capturing variations. In response to not identifying the target object using an appearance-based method, the object recognition system may need to capture a substantial number of images of the target object to generate a substantial number of templates for future identification operations. The substantial number of generated templates can cause a reduction of available storage resources included in the robot.

Techniques to generate reference computer-based models in devices using feature-based methods have also been attempted in the past. For example, an object recognition system can use a feature-based method to identify baseline or calibration image features (e.g., image corners, image edges, etc.) in an ideal image of a reference object and generate a model that can be overlaid onto an image of a target object. If a specified number of features match, then the object recognition system can identify the target object as the reference object within a degree of probability certainty. However, typical object recognition tasks may include processing a substantial number of features and numerous objects during a short time duration and an exhaustive matching technique may be too slow to be useful. In response to not identifying the target object using a feature-based method, the object recognition system may need to use a considerable portion of available computing resources to generate a reference object.

Disclosed herein are example systems, methods, apparatus, and articles of manufacture to improve object recognition. For example, often a device equipped with a visual imaging system encounters an object to which the device cannot identify using a typical object recognition system. For example, a device such as a domestic robot may capture a video of a target object such as a coffee cup, translate a frame in the video to a computer-based model, and attempt to identify the target object by comparing the computer-based model of the target object to a reference computer-based model included in a database stored in the domestic robot. In prior examples, the device uses computationally and/or storage-intensive object-recognition methods to generate a new reference computer-based model of the target object when the target object cannot be identified.

Disclosed herein are example systems, methods, apparatus, and articles of manufacture to improve object recognition by using a visual identifier on the target object to generate more accurate reference computer-based models. In some disclosed examples, an object manufacturer marks an object with one or more visual identifiers. For example, the visual identifier may be a machine-readable image such as a bar code (e.g., a universal product code (UPC) bar code), a quick response (QR) code, etc. For example, the target object may be a coffee cup with a QR code printed on the coffee cup. Additionally or alternatively, the visual identifier may be text. For example, the visual identifier may be a text-based identifier (e.g., a text-based visual identifier) including one or more alphanumeric characters representing one or more words, phrases, uniform resource locators (URLs), etc.

In some disclosed examples, an object-recognition system captures a video (e.g., one or more video frames) or a still-image of the visual identifier on a target object, processes the visual identifier, and obtains corresponding identification information from an external repository (e.g., an online database, an object manufacturer database, etc.) based on information included in the processed visual identifier. For example, the external repository may include a validated reference computer-based model of the coffee cup, detectable object-recognition system features of the coffee cup, etc.

In some examples, the object-recognition system maps the obtained information to the video frame or the still-image of the target object and store the mapping in a training image database. In response to storing the mapping, the example object-recognition system may identify a substantially similar target object in a future encounter using the stored mapping. For example, a device such as a robot may encounter a second coffee cup identical to the first coffee cup except the second coffee cup does not have the visual identifier. In such an example, the object-recognition system may identify the second coffee cup as the same coffee cup as the first coffee cup based on the stored mapping.

Figure 1:
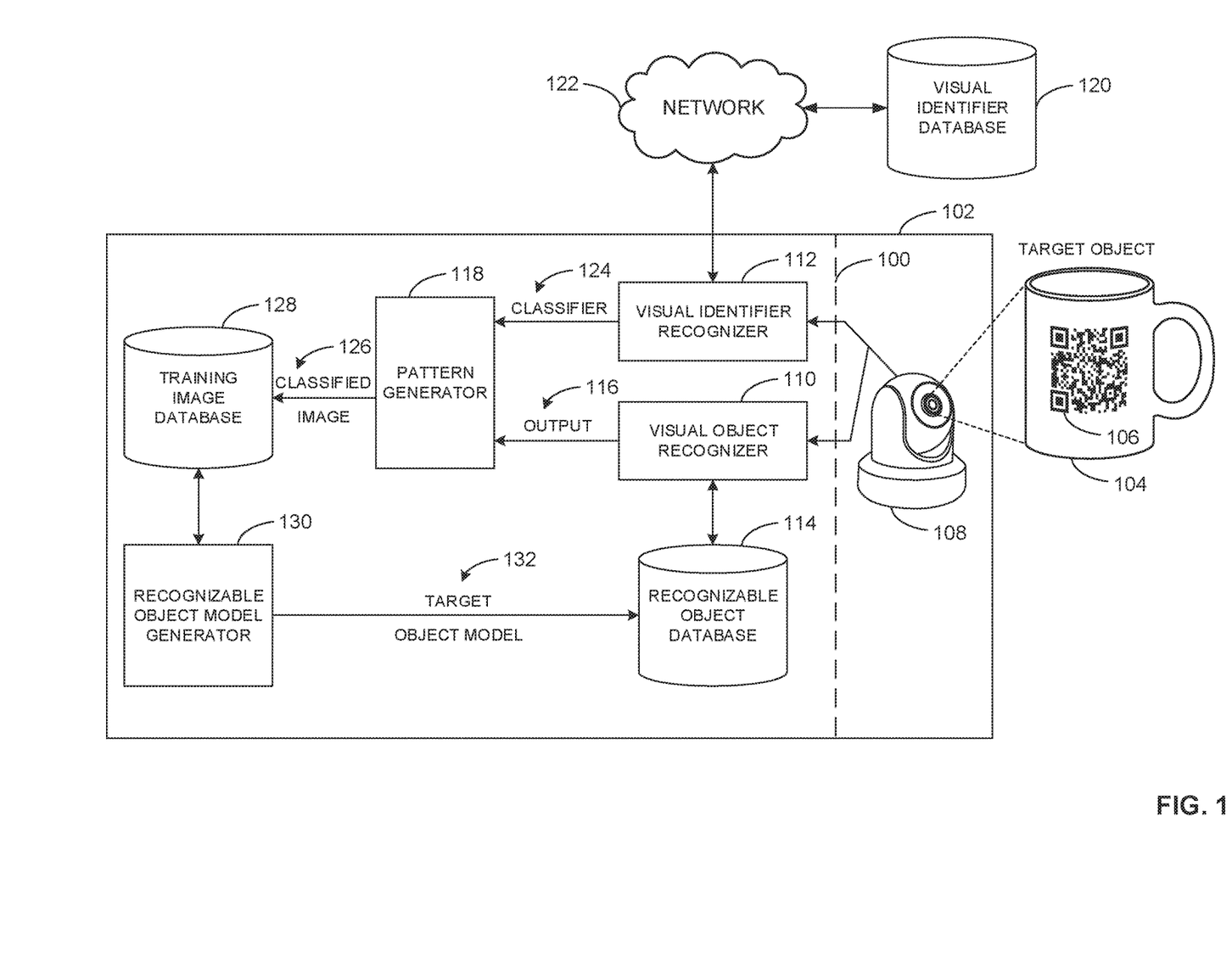
FIG. 1 is a schematic illustration of an example object recognition system capable of analyzing an example target object.

FIG. 1 is a schematic illustration of an example object recognition system (ORS) 100 executed by a device 102 analyzing an example target object 104. The ORS 100 of the illustrated example uses one or more appearance-based methods for object recognition. For example, the ORS 100 may identify the target object 104 using an appearance-based method such as edge matching, divide-and-conquer search, greyscale matching, gradient matching, etc. Alternatively, the example ORS 100 may use one or more feature-based methods or any other type of object-recognition method to identify the example target object 104. In the illustrated example, the device 102 is a robot (e.g., a domestic robot, a personal robot, etc.). Alternatively, the example device 102 may be an entertainment device such as a virtual reality imaging system, an Internet-enabled mobile handset (e.g., a smartphone), a table computer, a vehicle (e.g., an automobile, a bus, a train, etc.), an aerial vehicle (e.g., an unmanned aerial vehicle, a drone, a semi-autonomous drone, an autonomous drone, etc.), etc. Alternatively, the example device 102 may be any other type of machine equipped with a visual imaging system.

In the illustrated example, the target object 104 is a coffee cup with a visual identifier 106 printed on the coffee cup (e.g., the visual identifier 106 is associated with the coffee cup). Alternatively, the example target object 104 may be any other tangible object capable of being used by the device 102 such as a box, a plate, a key, etc. The visual identifier 106 of the illustrated example is a QR code. Alternatively, the example visual identifier 106 may be any other type of machine-readable visual identifier such as a bar code (e.g., a UPC bar code), one or more alphanumeric characters representing a URL, one or more alphanumeric characters representing a word or a phrase, etc.

In the illustrated example of FIG. 1, the device 102 includes a camera system 108 to capture video (e.g., one or more video frames) or a still-image of the target object 104. The camera system 108 of the illustrated example is a digital camera including an image sensor chip that translates light reflected from the target object 104 into one or more machine-readable numbers (e.g., binary numbers, hex codes, etc.). For example, the camera system 108 may capture and process an image of the target object 104, the visual identifier 106, etc., and/or a combination thereof. For example, the camera system 108 may generate a processed image of the target object 104 including machine-readable numbers corresponding to detectable features included in the image of the target object 104. In the illustrated example, the ORS 100 transmits the processed image (e.g., the machine-readable numbers) of the target object 104 to a visual object recognizer 110 and a visual identifier recognizer 112. Additionally or alternatively, the example visual object recognizer and/or the visual identifier recognizer 112 may obtain the visual identifier 106 associated with the target object 104 via any other image collection or image obtaining mechanism.

In the illustrated example of FIG. 1, the ORS 100 includes the visual object recognizer 110 to identify the target object 104 by comparing a processed image of the target object 104 to a reference image or a reference computer-based model (e.g., a template object) included in a recognizable object database 114. For example, the visual object recognizer 110 may compare detectable features included in the image of the target object 104 to detectable features corresponding to one or more template objects stored in the recognizable object database 114.

In some examples, the visual object recognizer 110 identifies the target object 104 by determining a match between the detectable features in the processed image of the target object 104 and the detectable features in the template object stored in the recognizable object database 114. For example, the visual object recognizer 110 may identify the target object 104 as an object corresponding to the stored template object based on the match. In some examples, the visual object recognizer 110 does not identify the target object 104 by not determining a match between the detectable features in the processed image of the target object 104 and the detectable features corresponding to one or more template objects stored in the recognizable object database 114. In response to not identifying the target object 104, the visual object recognizer 110 transmits an output 116 to a pattern generator 118. For example, the output 116 may correspond to an unclassified image. For example, the output 116 may correspond to the captured image, the processed image, etc., of the target object 104. In another example, the output 116 may correspond to a null output (e.g., no image, no output, etc.). For example, the output 116 may correspond to an indication of a lack of a recognized object in the captured image of the target object 104.

In the illustrated example of FIG. 1, the ORS 100 includes the visual identifier recognizer 112 to determine whether a visual identifier is included in the captured image of the target object 104. For example, the visual identifier recognizer 112 may scan the captured image of the target object 104 for a QR code, a bar code, etc. In the illustrated example, the visual identifier recognizer 112 identifies the QR code 106 printed on the target object 104. In response to identifying the example QR code 106, the example visual identifier recognizer 112 processes (e.g., decodes, unpackages, etc.) the QR code 106.

In some examples, the QR code 106 includes a uniform resource locator (URL). For example, the visual identifier recognizer 112 may identify a URL based on decoding the QR code 106. In the illustrated example, the visual identifier recognizer 112 queries a visual identifier database 120 via a network 122 in response to accessing the URL included in the QR code 106. In the illustrated example, the visual identifier database 120 is an external database communicatively coupled to the device 102 via the network 122. The visual identifier database 120 of the illustrated example is a classification service database that includes classifier information corresponding to the target object 104 including an object type, size, shape, usage, etc., of the target object 104. Alternatively, the example visual identifier database 120 may be an object manufacturer database. For example, the visual identifier database 120 may be a database corresponding to a manufacturer of the target object 104 including the classifier information. For example, the visual identifier database 120 may be managed, operated, owned, etc., by a manufacturer of the target object 104. In some examples, the visual identifier recognizer 112 obtains classifier information corresponding to the target object 104 from the visual identifier database 120 in response to accessing a URL included in the QR code 106. Alternatively, the example visual identifier recognizer 112 may obtain classifier information corresponding to the example target object 104 from the example visual identifier database 120 in response to accessing a UPC bar code, a text-based visual identifier representing a URL, etc., corresponding to a visual identifier on the target object 104.

The network 122 of the illustrated example of FIG. 1 is the Internet. However, the example network 122 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 122 enables the example ORS 100 to be in communication with the example visual identifier database 120. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time messages.

In the illustrated example of FIG. 1, the visual identifier recognizer 112 transmits a classifier 124 to the pattern generator 118. For example, the classifier 124 may include classifier information that can be used by the visual object recognizer 110 to identify the target object 104 using an appearance-based method, a feature-based method, etc. For example, the classifier 124 may include detectable features of the target object 104, a computer-based model of the target object 104, etc.

In the illustrated example of FIG. 1, the ORS 100 includes the pattern generator 118 to associate, correlate, map, etc., the classifier 124 of the target object 104 with the output 116 (e.g., an unclassified image) of the target object 104. For example, the pattern generator 118 may map the output 116 of the target object 104 to the classifier information included in the classifier 124. The pattern generator 118 of the illustrated example generates a classified image 126 and stores the classified image 126 in a training image database 128. The classified image 126 of the illustrated example is a reference image of the target object 104 including reliable detectable features. For example, a reliable detectable feature of an object may be an easily and/or a readily detectable feature provided by a manufacturer of the object, a classification service, etc. Alternatively, the example classified image 126 may be a reference processed image. The example ORS 100 of the illustrated example includes the example training image database 128 to store classified images of objects previously not identified by the device 102.

In the illustrated example of FIG. 1, the ORS 100 includes a recognizable object model generator 130 to generate a target object model 132 corresponding to an unidentified object encountered by the device 102. For example, the recognizable object model generator 130 may generate a target object model corresponding to the target object 104. The target object model 132 of the illustrated example is a reference computer-based model of the target object 104. For example, the target object model 132 may be an appearance-based method model, a feature-based method model, etc., of the target object 104.

In the illustrated example of FIG. 1, the recognizable object model generator 130 generates the target object model 132 corresponding to the target object 104 based on one or more of the classified images 126 of the target object 104. The recognizable object model generator 130 of the illustrated example stores the target object model 132 in the recognizable object database 114 to be used by the visual object recognizer 110. For example, the visual object recognizer 110 may map a processed image of a substantially similar (e.g., a copy, a near-identical version, etc.) object to the target object 104 (e.g., a second coffee cup) where the substantially similar object does not have a visual identifier such as the visual identifier 106 of the target object 104. In such an example, the visual object recognizer 110 may identify the substantially similar object as the target object 104 when the comparison generates a match.

In the illustrated example of FIG. 1, the ORS 100 includes the recognizable object database 114 and the training image database 128 to record data (e.g., the classified image 126, the target object model 132, etc.) in the device 102 for local use by the device 102. The databases 114, 128 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The databases 114, 128 may additionally or alternatively be implemented by one or more double data rate (DDR) memories, such as DDR, DDR2, DDR3, DDR4, mobile DDR (mDDR), etc. The databases 114, 128 may additionally or alternatively be implemented by one or more mass storage devices such as hard disk drive(s), compact disk drive(s) digital versatile disk drive(s), etc. While in the illustrated example the databases 114, 128 are illustrated as single databases, the databases 114, 128 may be implemented by any number and/or type(s) of databases. Furthermore, the data stored in the databases 114, 128 may be in any data format such as, for example, binary data, comma delimited data, tab delimited data, structured query language (SQL) structures, object-recognition data, object-recognition models, etc.

Figure 2:
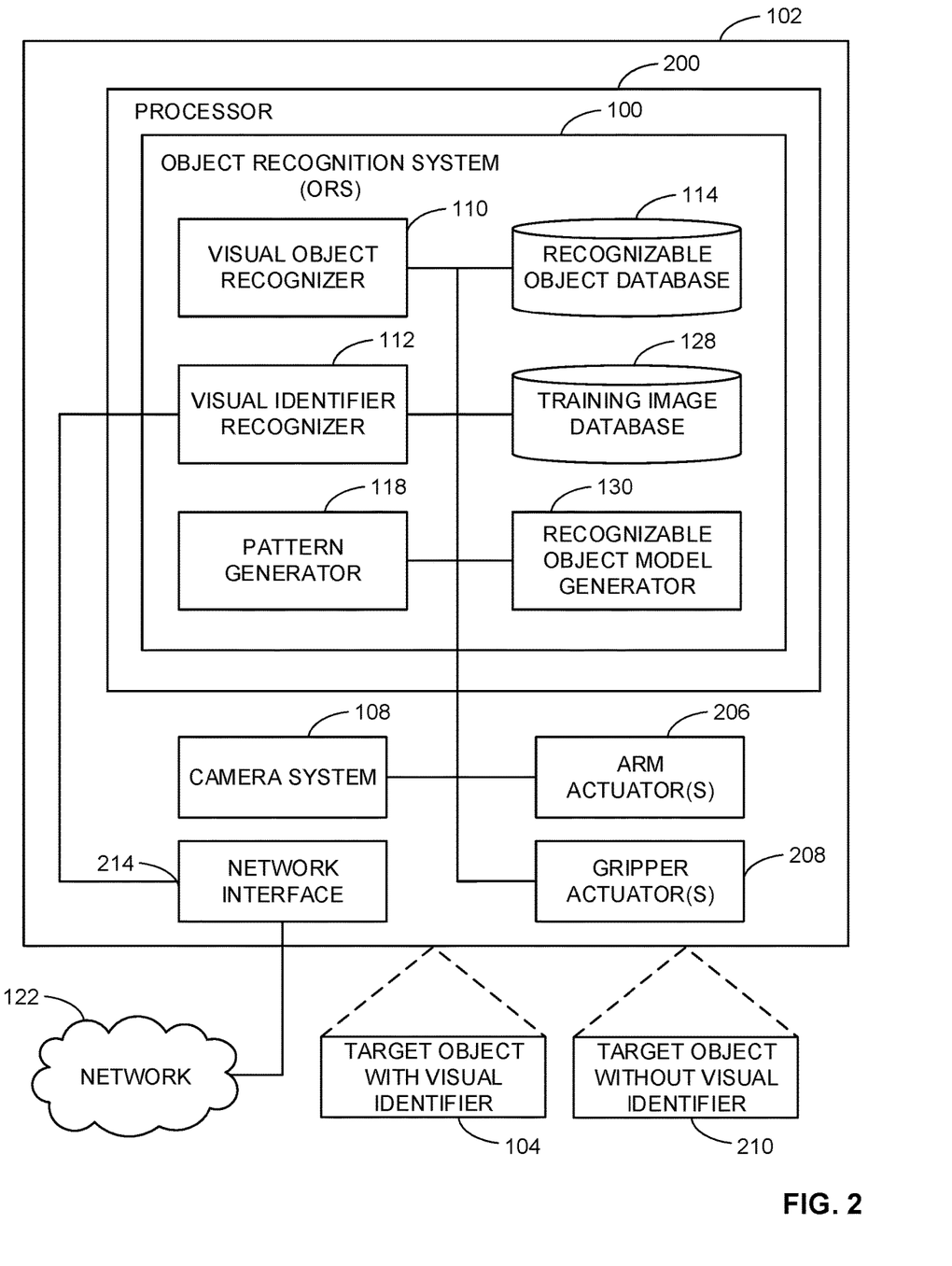
FIG. 2 is a block diagram of an example implementation of the example object recognition system of FIG. 1.

FIG. 2 is a block diagram of an example implementation of the example ORS 100 of FIG. 1 included in the example device 102 of FIG. 1. In the illustrated example of FIG. 2, the device 102 includes one or more processors 200 to control the various components of the device 102. For example, the processor 200 may implement the ORS 100 including the example visual object recognizer 110, the example visual identifier recognizer 112, the example recognizable object database 114, the example pattern generator 118, the example training image database 128, and the example recognizable object model generator 130 of FIG. 1.

In the illustrated example of FIG. 2, the device 102 is a robot. Alternatively, the device 102 may be any other type of machine equipped with a visual imaging system. In the illustrated example, the device 102 includes the camera system 108 of FIG. 1, one or more arm actuator(s) 206, and one or more gripper actuator(s) 208 to interface with an encountered object. Alternatively, the example device 102 of the illustrated example of FIG. 2 may not include the arm actuator 206 and/or the gripper actuator 208. In the illustrated example, the processor 200 directs an action of the arm actuator 206 and/or the gripper actuator 208. For example, the processor 200 may command the arm actuator 206 to control a moveable arm of the device 102. For example, the processor 200 may command the arm actuator 206 to extend one or more arms of the device 102 towards an object, retract one or more arms of the device 102 away from an object, etc. In another example, the processor 200 may command the gripper actuator 208 to control a gripper (e.g., a clamp, a mechanical hand, etc.) of the device 102. For example, the processor 200 may command the gripper actuator 208 to grab, flip, rotate, support, etc., and/or otherwise manipulate an object encountered by the device 102.

In the illustrated example of FIG. 2, the processor 200 executes instructions to operate the camera system 108, the arm actuator 206, and/or the gripper actuator 208 when the device 102 encounters the first object 104 (e.g., the target object with a visual identifier 104, the target object 104 of FIG. 1, etc.) or a second object 210 such as a target object without a visual identifier 210. In the illustrated example, the first object 104 corresponds to the target object 104 of FIG. 1. For example, the first object 104 may be a first coffee cup with a QR code (e.g., the QR code 106 of FIG. 1) labeled, printed, and/or otherwise affixed to the first coffee cup. The second object 210 may correspond to a substantially similar object compared to the target object 104 of FIG. 1. For example, the second object 210 may be a second coffee cup without a QR code, where the second coffee cup is otherwise the same or substantially similar to the first coffee cup.

In some examples, the processor 200 executes instructions to operate the camera system 108, the arm actuator 206, and/or the gripper actuator 208 when the device 102 encounters the first object 104 (e.g., the target object with a visual identifier 104). For example, the processor 200 may execute instructions to direct the camera system 108 to capture an image of the first object 104, to direct the arm actuator 206 and/or the gripper actuator 208 to manipulate the first object 104 into an adjusted position and capture the image of the first object 104 in the adjusted position, etc. For example, the visual object recognizer 110 may direct the camera system 108 to capture an image of the first object 104. In another example, the visual identifier recognizer 112 may direct the camera system 108 to capture an image of the first object 104.

In some examples, the ORS 100 does not identify a visual identifier based on processing the captured image via the visual identifier recognizer 112. For example, the captured image may correspond to an image of the second object 210. In some examples, the processor 200 executes instructions to direct the one or more arm actuators 206 and/or the one or more gripper actuators 208 to manipulate the second object 210 to adjust an image condition of the second object 210. For example, the visual object recognizer 110 and/or the visual identifier recognizer 112 may direct the gripper actuator 208 to rotate (e.g., iteratively rotate) the second object 210 and to direct the camera system 108 to capture (e.g., iteratively capture) an image of the second object 210 in the new orientation. For example, the visual object recognizer 110 may direct the camera system 108 to capture an image of the second object 210 in response to not identifying the second object 210. In another example, the visual identifier recognizer 112 may direct the camera system 108 to capture an image of the second object 210 in response to not identifying a visual identifier associated with the second object 210.

In some examples, the ORS 100 attempts to capture a visual identifier on an object by capturing an image of a location on the object typically known to have the visual identifier. For example, the visual object recognizer 110 may identify the first object 104 as a coffee cup without capturing the visual identifier 106 of FIG. 1 (e.g., by comparing the processed image of the first object 104 to the reference computer-based model in the recognizable object database 114). In such an example, the visual object recognizer 110 may verify the identification by identifying a visual identifier on the first object 104, but the visual identifier is not included in a captured image of the first object 104.

In some examples, the visual object recognizer 110 determines a typical location for a visual identifier for an object that is substantially similar to the first object 104. For example, the visual object recognizer 110 may identify the first object 104 as a coffee mug (e.g., within a degree of certainty, a tolerance threshold, etc.) and determine that a coffee mug typically includes a visual identifier such as a QR code on the bottom of the coffee mug. For example, the visual object recognizer 110 may determine a typical visual identifier location for an object, an object type, etc., by querying the recognizable object database 114, by querying the visual identifier database 120, a database of common visual identifier locations on objects, etc.

In response to the determination of the typical visual identifier location, the example processor 200 may execute instructions to direct the one or more arm actuators 206 and/or the one or more gripper actuators 208 to manipulate the first object 104 (e.g., to direct a manipulation of the target object 104) to capture an image of the typical visual identifier location (e.g., the bottom of the first object 104) to increase a likelihood of capturing a visual identifier. In response to the captured image including the visual identifier, the example visual identifier recognizer 112 may identify the visual identifier on the bottom of the first object 104 and verify the identification of the first object 104 based on processing the visual identifier in the captured image.

In some examples, the visual identifier recognizer 112 queries an external database communicatively coupled to the network 122 via a network interface 212 when the example visual object recognizer 110 cannot recognize the second object 210 and the visual identifier recognizer 112 determines that the second object 210 does not include a visual identifier. For example, the visual identifier recognizer 112 may query the visual identifier database 120 via the network 122 using the network interface 212. In some examples, the visual identifier recognizer 112 uploads the image of the second object 210 to the visual identifier database 120. For example, a second device in another environment may use the image of the second object 210 to generate a computer-based model of the second object 210. In such an example, the device 102 may obtain the computer-based model of the second object 210 when the second device uploads the computer-based model to the visual identifier database 120.

In some examples, the ORS 100 does not identify a visual identifier of an object with a visual identifier based on processing the captured image via the visual identifier recognizer 112. For example, the captured image may correspond to an image of the first object 104. In such examples, the processor 200 executes instructions to direct the one or more arm actuators 206 and/or the one or more gripper actuators 208 to manipulate the first object 104. For example, the processor 200 may execute instructions to direct the gripper actuator 208 to rotate (e.g., iteratively rotate) the first object 104, to direct the camera system 108 to capture (e.g., iteratively capture) an image of the first object 104 in the new orientation, and identify a visual identifier based on processing the captured image of the first object 104 in the new orientation via the visual identifier recognizer 112.

In some examples, the ORS 100 identifies a visual identifier based on processing the captured image via the visual identifier recognizer 112. For example, the visual identifier recognizer 112 may decode the QR code 106 of FIG. 1 and extract a URL from the decoded QR code 106. In response to extracting the URL, the example visual identifier recognizer 112 may access the URL via the network interface 212. In another example, the visual identifier recognizer 112 may access a URL in response to analyzing, detecting, decoding, etc., a text-based visual identifier corresponding to the URL corresponding to a visual identifier on the first object 104.

In the illustrated example of FIG. 2, the device 102 includes the network interface 212 to obtain information from and/or transmit information to the network 122 of FIG. 1. For example, the processor 200 may execute instructions to transmit and/or receive classifier information via the network interface 212. In the illustrated example, the example network interface 212 implements a web server that accesses a URL and receives classifier information corresponding to the first object 104 in response to accessing the URL. For example, the network interface 212 may obtain the classifier 124 of FIG. 1 from the visual identifier database 120 via the network 122. In the illustrated example, the classifier information is formatted as an HTTP message. However, any other message format and/or protocol may additionally or alternatively be used such as, for example, a file transfer protocol (FTP), a simple message transfer protocol (SMTP), an HTTP secure (HTTPS) protocol, etc.

In some examples, the pattern generator 118 generates the classified image 126 of FIG. 1 by mapping the classifier 124 obtained via the network interface 212 to an unclassified image of the first object 104. For example, the unclassified image of the first object 104 may correspond to the output 116 of FIG. 1. In some examples, the recognizable object model generator 130 determines whether the number of classified images included in the training image database 128 satisfies a model creation threshold. For example, the model creation threshold may correspond to a quantity of classified images of the first object 104 corresponding to one or more image capturing conditions. For example, the model creation threshold may correspond to 10 classified images of the first object 104 where each one of the 10 classified images includes a different orientation, lighting condition, and/or distance of the first object 104 from a perspective of the device 102.

In some examples, the recognizable object model generator 130 generates a computer-based model of the first object 104 (e.g., the target object model 132) based on a comparison of a number of classified images in the training image database 128 to a model creation threshold. For example, the recognizable object model generator 130 may determine that there are 12 classified images corresponding to the first object 104 in the training image database 128. For example, the recognizable object model generator 130 may compare the 12 classified images to a model creation threshold of 10 classified images and generate a computer-based model of the first object 104 based on the 12 classified images being greater than the model creation threshold of 10 classified images.

In some examples, the recognizable object model generator 130 determines not to generate a computer-based model of the first object 104 (e.g., the target object model 132) based on a comparison of a number of classified images in the training image database 128 to a model creation threshold. For example, the recognizable object model generator 130 may determine that there are 3 classified images corresponding to the first object 104 in the training image database 128. For example, the recognizable object model generator 130 may compare the 3 classified images to a model creation threshold of 10 classified images and determine not to create a computer-based model of the first object 104 based on the 3 classified images being less than the model creation threshold of 10 classified images.

In some examples, the example recognizable object model generator 130 determines that additional classified images of the first object 104 are needed in response to determining that the number of classified images in the training image database 128 does not satisfy a model creation threshold. In such examples, the processor 200 executes instructions directing the arm actuator 206 and/or the gripper actuator 208 to manipulate the first object 104 by adjusting a distance between the device 102 and the first object 104, an orientation of the first object 104, etc. The example processor 200 may execute instructions directing the camera system 108 to capture one or more images of the first object 104 in response to an adjustment of the image conditions corresponding to the first object 104. In another example, the processor 200 may execute instructions directing the camera system to operate a camera flash or other lighting mechanism when capturing the one or more images to adjust a lighting condition of the first object 104.

In response to capturing the one or more images of the first object 104 based on an adjustment of an image condition of the first object 104, the example pattern generator 118 may map the example classifier 124 of FIG. 1 to the one or more images of the first object 104 and store the mapping (e.g., the example classified image 126 of FIG. 1) in the example training image database 128. The example recognizable object model generator 130 may compare an updated number of the classified images 126 corresponding to the first object 104 to the model creation threshold and determine whether to generate the computer-based model of the first object 104 based on the comparison.

While an example manner of implementing the ORS 100 of FIG. 1 is illustrated in FIG. 2, one or more of the elements, processes and/or devices illustrated in FIG. 2 may be combined, divided, re-arranged, omitted, eliminated, and/or implemented in any other way. Further, the example visual object recognizer 110, the example visual identifier recognizer 112, the example recognizable object database 114, the example pattern generator 118, the example training image database 128, the example recognizable object model generator 130, and/or, more generally, the example ORS 100 of FIG. 3 may be implemented by hardware, software, firmware and/or any combination of hardware, software and/or firmware. Thus, for example, any of the example visual object recognizer 110, the example visual identifier recognizer 112, the example recognizable object database 114, the example pattern generator 118, the example training image database 128, the example recognizable object model generator 130 and/or, more generally, the example ORS 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example visual object recognizer 110, the example visual identifier recognizer 112, the example recognizable object database 114, the example pattern generator 118, the example training image database 128, the example recognizable object model generator 130 is/are hereby expressly defined to include a non-transitory computer readable storage device or storage disk such as a memory, a digital versatile disk (DVD), a compact disk (CD), a Blu-ray disk, etc. including the software and/or firmware. Further still, the example ORS 100 of FIG. 1 may include one or more elements, processes and/or devices in addition to, or instead of, those illustrated in FIG. 2, and/or may include more than one of any or all of the illustrated elements, processes, and devices.

Figure 3:
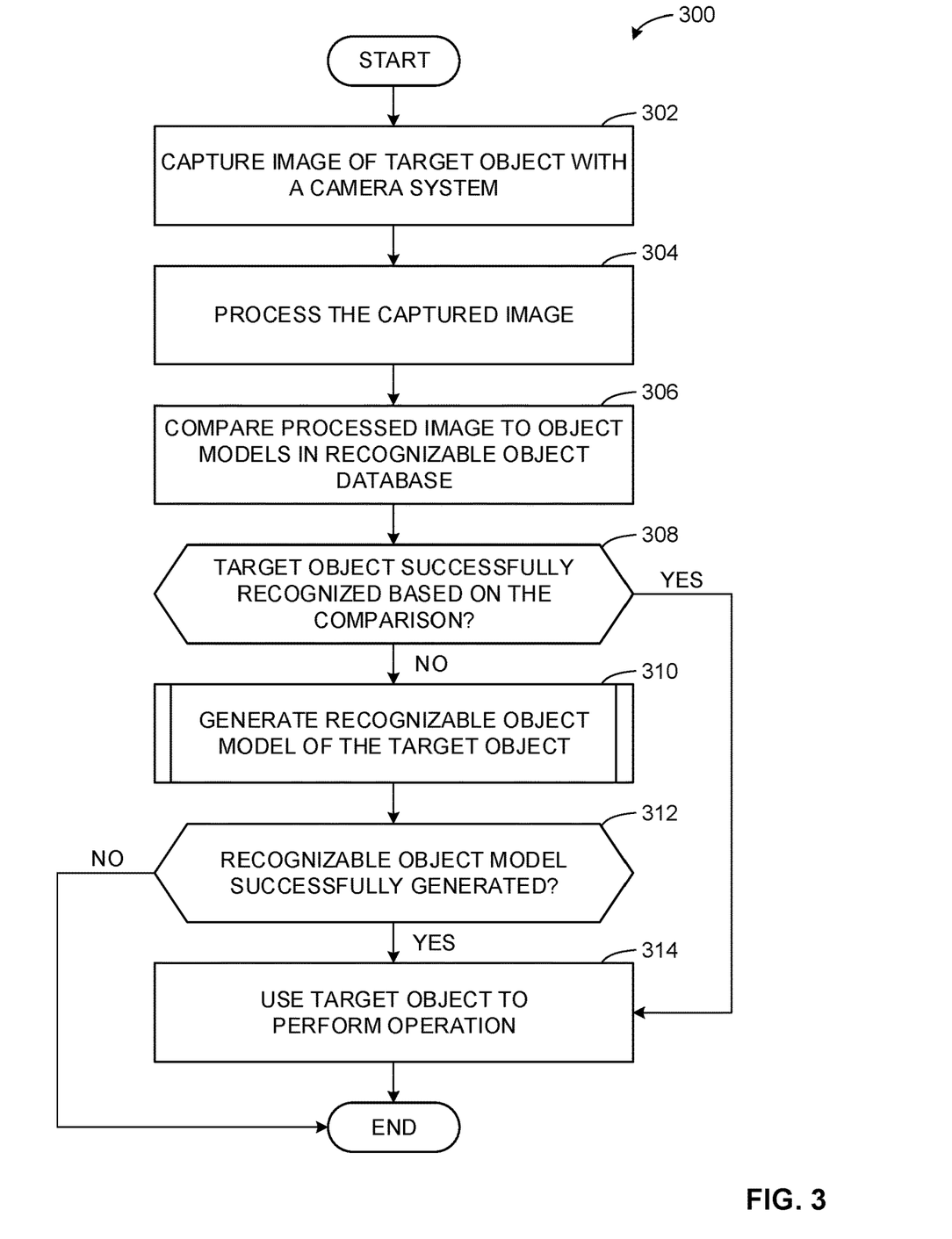
FIG. 3 is a flowchart representative of example machine readable instructions that may be executed by the example object recognition system of FIGS. 1-2 to use a target object to perform an operation based on processing an image of the target object.
Figure 4A:
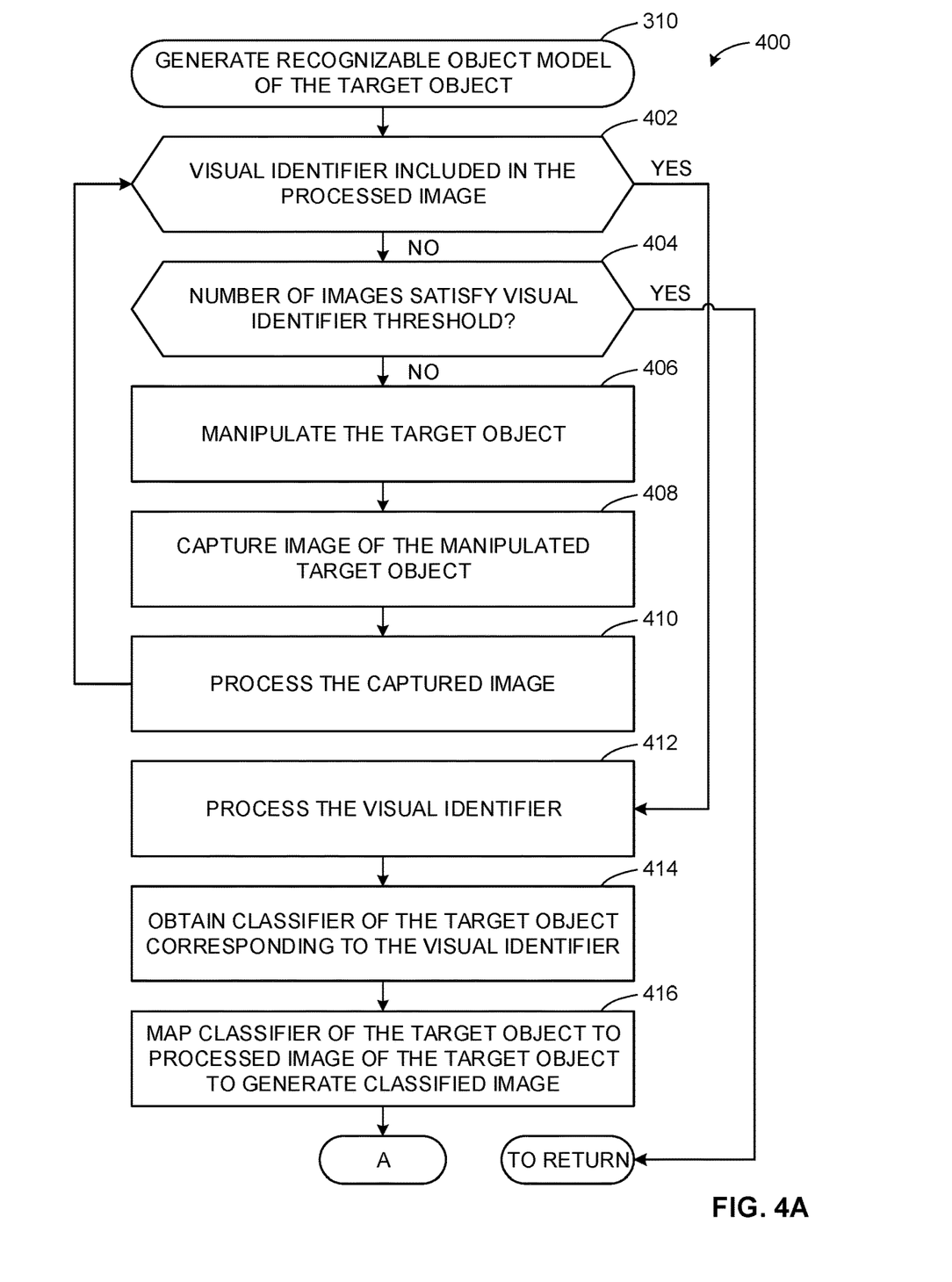
FIGS. 4A-4B illustrate a flowchart representative of example machine readable instructions that may be executed by the example object recognition system of FIGS. 1-2 to generate a recognizable object model of a target object.
Figure 4B:
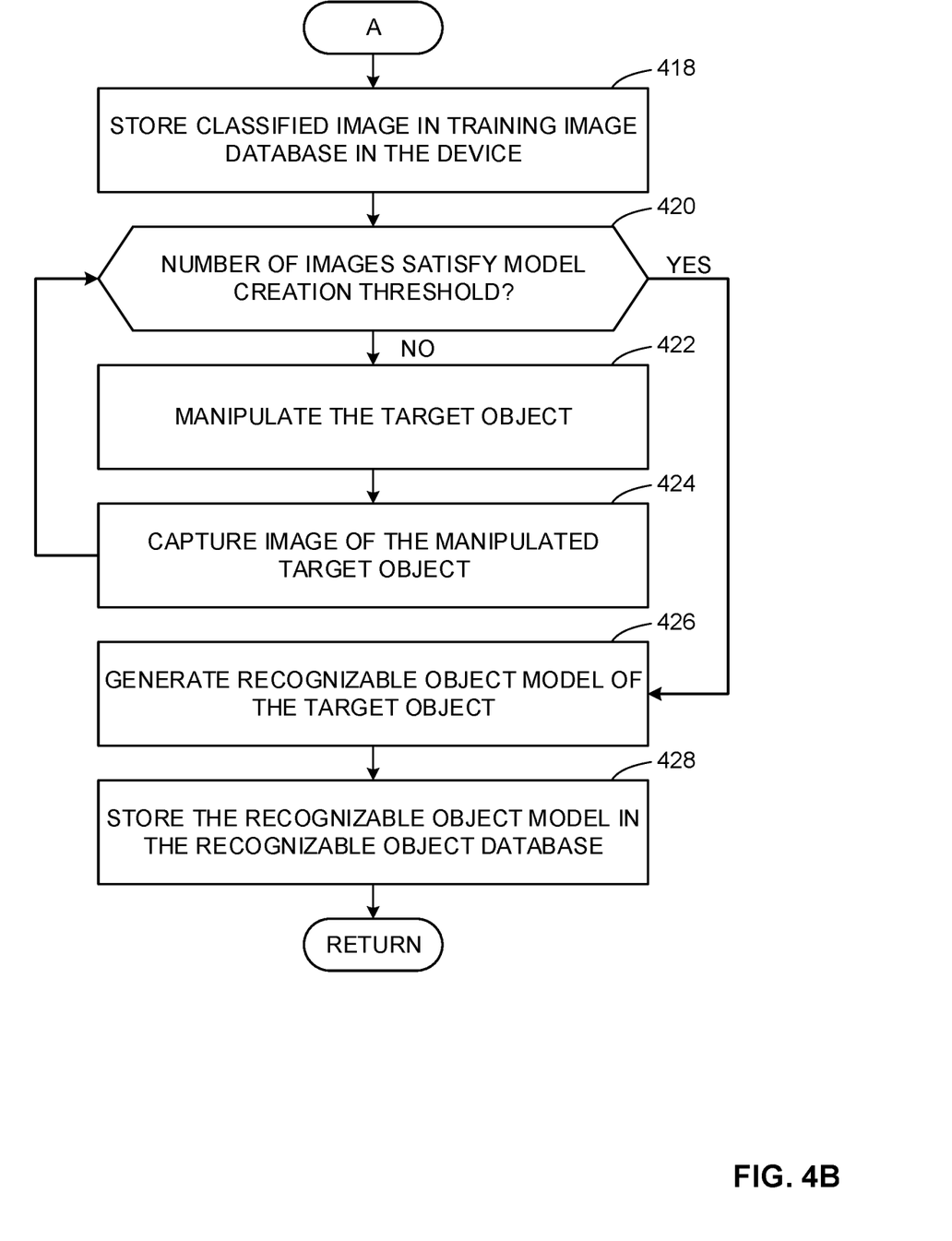

Flowcharts representative of example machine readable instructions for implementing the ORS 100 of FIGS. 1-2 are shown in FIGS. 3-4. In these examples, the machine readable instructions comprise a program for execution by a processor such as a processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 3-4, many other methods of implementing the example ORS 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 3-4 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

FIG. 3 is a flowchart representative of example machine readable instructions that may be executed by the example ORS 100 of FIGS. 1-2 to enable the device 102 of FIGS. 1-2 to use a target object to perform an operation (e.g., to manipulate the target object 104 of FIG. 1, to perform a software-based operation, etc.) based on processing an image of the target object. The example method 300 begins at block 302 at which the example ORS 100 captures an image of a target object with a camera system. For example, the processor 200 of FIG. 2 may execute instructions to command the camera system 108 of FIGS. 1-2 to capture an image of the target object 104 of FIG. 1. In another example, the processor 200 may execute instructions commanding the arm actuator 206 and/or the gripper actuator 208 to manipulate the target object 104 to ensure a typical location of a visual identifier for an object type substantially similar to the target object 104 is in view of the camera system 108 to increase a likelihood of capturing a visual identifier.

At block 304, the example ORS 100 processes the captured image. For example, the processor 200 may execute instructions to direct the camera system 108 to process the captured image by translating the captured image into machine readable numbers. In another example, the processor 200 may execute instructions to direct the visual object recognizer 110 to identify detectable features in the captured image of the target object 104.

At block 306, the example ORS 100 compares the processed image to object models in a recognizable object database. For example, the processor 200 may execute instructions to command the visual object recognizer 110 to compare detectable features in the processed image to detectable features included in one or more reference computer-based models included in the recognizable object database 114 of FIGS. 1-2.

At block 308, the example ORS 100 determines whether the target object is successfully recognized based on the comparison. For example, the processor 200 may execute instructions to direct the visual object recognizer 110 to identify the target object 104 as an object corresponding to a reference computer-based model in the recognizable object database 114 based on matching (e.g., substantially matching within a probabilistic degree of certainty) the processed image to the reference computer-based model.

If, at block 308, the example ORS 100 determines that the target object is successfully recognized based on the comparison, control proceeds to block 314 to use the target object to perform an operation. If, at block 308, the example ORS 100 determines that the target object is not successfully recognized based on the comparison, then, at block 310, the ORS 100 generates a recognizable object model of the target object. For example, the processor 200 may execute instructions to direct the recognizable object model generator 130 to generate a reference computer-based model of the target object 104 when the number of classified images of the target object 104 satisfies a model creation threshold.

At block 312, the example ORS 100 determines whether the recognizable object model was successfully generated. For example, the recognizable object model generator 130 may not generate a recognizable object model of the target object 104 if the visual identifier recognizer 112 determines that the target object 104 does not include a visual identifier such as the QR code 106 of FIG. 1.

If, at block 312, the example ORS 100 determines that the recognizable object model was not successfully generated, then the example method 300 concludes. If, at block 312, the example ORS 100 determines recognizable object model was successfully generated, then, at block 314, the example device 102 uses the target object to perform an operation. For example, the processor 200 may execute instructions to command the arm actuator 206 and/or the gripper actuator 208 to perform an operation using the target object 104 (e.g., move the target object 104, pick up the target object 104, perform a software-based operation using an identification of the target object 104, etc.). In response to the example device 102 using the target object to perform the operation, the example method 300 concludes.

FIGS. 4A-4B illustrate a flowchart representative of example machine readable instructions that may be executed by the example ORS 100 of FIGS. 1-2 to generate a recognizable object model of a target object. The example method 400 begins at block 402 at which the example ORS 100 determines whether there is a visual identifier included in the processed image. For example, the visual identifier recognizer 112 may determine that the target object 104 of FIG. 1 includes the QR code 106 of FIG. 1.

If, at block 402, the example ORS 100 determines that there is a visual identifier included in the processed image, control proceeds to block 412 to process the visual identifier. If, at block 402, the example ORS 100 determines that there is not a visual identifier included in the processed image, then, at block 404, the ORS 100 determines whether a number of images satisfies a visual identifier threshold. For example, the visual identifier recognizer 112 may determine that the target object 104 does not include a visual identifier based on analyzing a number (e.g., a pre-defined number) of previously captured and/or processed images of the target object 104 that do not include the visual identifier.

If, at block 404, the example ORS 100 determines that the number of images satisfy the visual identifier threshold, control proceeds to return to block 312 of the example of FIG. 3 to determine whether the recognizable object model was successfully generated. If, at block 404, the example ORS 100 determines that the number of images do not satisfy the visual identifier threshold, then, at block 406, the device 102 manipulates the target object. For example, the processor 200 may execute instructions commanding the arm actuator 206 and/or the gripper actuator 208 to flip, rotate, and/or otherwise manipulate the target object 104. In another example, the processor 200 may execute instructions commanding the arm actuator 206 and/or the gripper actuator 208 to manipulate the target object 104 to ensure a typical location of a visual identifier for an object type substantially similar to the target object 104 is in view of the camera system 108.

At block 408, the example ORS 100 captures an image of the manipulated target object. For example, the processor 200 may execute instructions to direct the camera system 108 to capture an image of the target object 104 in an adjusted orientation, at an adjusted distance, with an adjusted lighting condition, etc., and/or a combination thereof.

At block 410, the example ORS 100 processes the captured image. For example, the processor 200 may execute instructions to direct the camera system 108 to process the captured image by translating the captured image into machine readable numbers. In another example, the processor 200 may execute instructions to direct the visual object recognizer 110 to identify detectable features in the captured image of the target object 104. In response to processing the captured image, the example ORS 100 determines whether a visual identifier is included in the processed image. In response to the example ORS 100 processing the captured image, control returns to block 402 to determine whether there is a visual identifier included in the processed image.

At block 412, the example ORS 100 processes the visual identifier. For example, the processor 200 may execute instructions directing the visual identifier recognizer 112 to extract a URL from the QR code 106 of FIG. 1 by decoding the QR code 106. At block 414, the example ORS 100 obtains a classifier of the target object corresponding to the visual identifier. For example, the processor 200 may execute instructions directing the network interface 212 of FIG. 2 to access the extracted URL via the network 122 of FIGS. 1-2.

At block 416, the example ORS 100 maps the classifier of the target object to the processed image of the target object to generate a classified image. For example, the processor 200 may execute instructions to command the pattern generator 118 of FIGS. 1-2 to generate the classified image 126 of FIG. 1 based on associating, correlating, and/or otherwise mapping the classifier 124 of FIG. 1 to the output 116 (e.g., an unclassified image) of FIG. 1.

At block 418, the example ORS 100 stores the classified image in a training image database in the device. For example, the processor 200 may execute instructions directing the pattern generator 118 to store the classified image 126 in the training image database 128 of FIGS. 1-2.

At block 420, the example ORS 100 determines whether a number of images satisfy a model creation threshold. For example, the recognizable object model generator 130 may determine that there are 12 classified images corresponding to the target object 104 in the training image database 128. In such an example, the recognizable object model generator 130 may determine that the model creation threshold has been satisfied based on determining that the number of stored classified images (e.g., the 12 classified images in the training image database 128) is greater than the model creation threshold of 10 classified images.

If, at block 420, the example ORS 100 determines that the number of images satisfy the model creation threshold, control proceeds to block 426 to generate a recognizable object model of the target object. If, at block 420, the example ORS 100 determines that the number of images does not satisfy the model creation threshold, then, at block 422, the ORS 100 manipulates the target object. For example, the processor 200 may execute instructions to direct the arm actuator 206 and/or the gripper actuator 208 to rotate, flip, and/or otherwise manipulate the target object 104. In another example, the processor 200 may execute instructions commanding the arm actuator 206 and/or the gripper actuator 208 to manipulate the target object 104 to ensure a typical location of a visual identifier for an object type substantially similar to the target object 104 is in view of the camera system 108.

At block 424, the example ORS 100 captures an image of the manipulated target object. For example, the processor 200 may execute instructions to direct the camera system 108 to capture an image of the target object 104 in an adjusted orientation, at an adjusted distance, with an adjusted lighting condition, etc., and/or a combination thereof. In response to the example ORS 100 capturing the image of the manipulated target object, control returns to block 420 to determine whether the number of images satisfy the model creation threshold.

At block 426, the example ORS 100 generates a recognizable object model of the target object. For example, the processor 200 may execute instructions to direct the recognizable object model generator 130 to generate a reference computer-based model (e.g., an appearance-based object recognition model, a feature-based object recognition model, etc.) of the target object 104 in response to determining that the number of classified images 126 included in the training image database 128 satisfies the model creation threshold.

At block 428, the example ORS 100 stores the recognizable object model in the recognizable object database. For example, the processor 200 may execute instructions to command the recognizable object model generator 130 to store the recognizable object model corresponding to the target object 104 in the recognizable object database 114 of FIGS. 1-2. For example, the device 102 of FIGS. 1-2 may use the stored recognizable object model corresponding to the target object 104 to identify a substantially similar object to the target object 104 in a future encounter where the substantially similar object does not include a visual identifier such as the QR code 106 of FIG. 1. In response to storing the recognizable object model in the recognizable object database in the device 102, the example method returns to block 312 to determine whether the recognizable object model was successfully generated.

Figure 5:
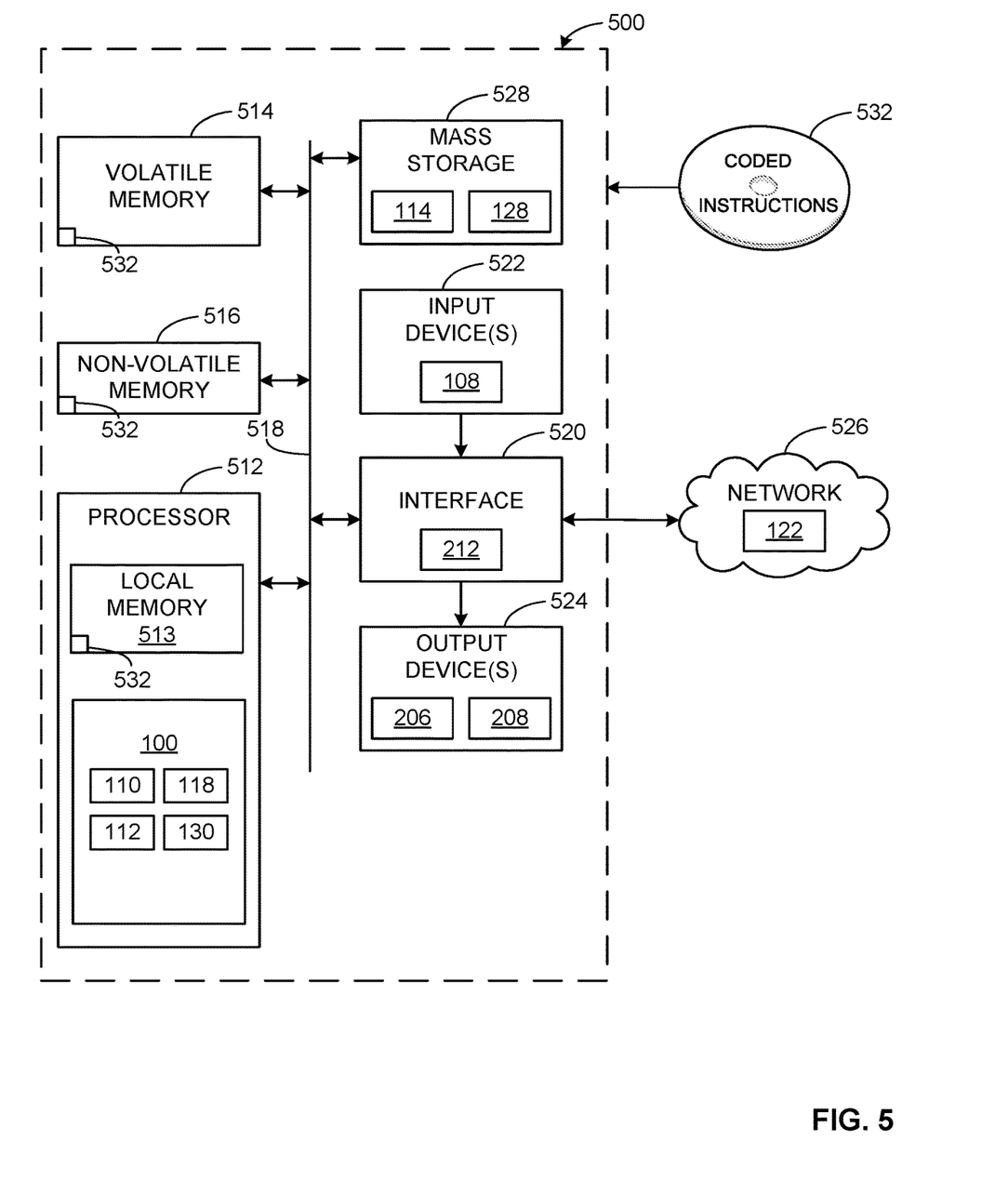
FIG. 5 is a block diagram of an example processing platform structured to execute machine readable instructions to implement the methods of FIGS. 3-4 and/or the example object recognition system of FIGS. 1-2.

FIG. 5 is a block diagram of an example processor platform 500 capable of executing the instructions of FIGS. 3-4 to implement the example ORS 100 of FIGS. 1-2. The processor platform 500 can be, for example, an Internet-enabled mobile handset processor platform, a robot processor platform, an aerial vehicle processor platform, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer. The hardware processor may be a semiconductor based (e.g., silicon based) device. In this example, the processor 512 implements the example visual object recognizer 110, the example visual identifier recognizer 112, the example pattern generator 118, and the example recognizable object model generator 130.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a peripheral component interconnect (PCI) express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, an isopoint device, and/or a voice recognition system. In this example, the input device(s) 522 implement(s) the camera system 108 of FIGS. 1-2.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers), an electro-mechanical actuator, etc. In this example, the output device(s) 524 implement(s) the arm actuator(s) 206 and the gripper actuator(s) 208 of FIG. 2. The interface circuit 520 of the illustrated example, thus, typically includes a graphics driver card, a graphics driver chip, and/or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.). In this example, the interface 520 implements the network interface 212 of FIG. 2. In this example, the network 526 implements the network 122 of FIGS. 1-2.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and DVD drives. In this example, the mass storage 528 implements the recognizable object database 114 and the training image database 128 of FIGS. 1-2.

The coded instructions 532 of FIGS. 3-4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus, systems, and articles of manufacture have been disclosed that improve an object recognition system to more accurately identify and interact with a tangible object to complete an operation. By generating classified images using classifier information corresponding to a visual identifier, the object recognition system can generate reference computer-based models using one or more reliable detectable features of an object. Generating reference computer-based models using the one or more reliable detectable features reduces computational and storage resources compared to prior examples. For example, the object recognition system can generate fewer reference computer-based models by using the classifier information compared to prior examples. In another example, the object recognition system can store fewer, but more reliable classified images and/or reference computer-based models compared to prior examples when using the classifier information corresponding to the visual identifier.

The above-disclosed object recognition system can decrease recognition error rate of a target object by using the reference computer-based models based on the classifier information. Over time, the object recognition system can more accurately identify previously unrecognizable encountered objects compared to prior examples by comparing an image of the object to one or more of the reference computer-based models based on the classifier information.

The following pertain to further examples disclosed herein.

Example 1 is an apparatus to perform object recognition including a visual object recognizer to obtain a visual identifier associated with a target object, and a recognizable object model generator to generate a model of the target object based on mapping an image of the target object to classifier information corresponding to the visual identifier.

In Example 2, the subject matter of Example 1 can optionally include the visual object recognizer to attempt to identify the target object by comparing the image to a reference computer-based model, and attempt to obtain the visual identifier associated with the target object when the target object is not identified.

In Example 3, the subject matter of any one of Examples 1-2 can optionally include that the recognizable object model generator is to store the model of the target object in a database.

In Example 4, the subject matter of any one of Examples 1-3 can optionally include the database.

In Example 5, the subject matter of any one of Examples 1-4 can optionally include that the target object is a first target object and the image is a first image, further including the visual object recognizer to obtain a second image of a second target object, the second target object being substantially similar to the first target object without the visual identifier, and identify the second target object by processing the second image using the model.

In Example 6, the subject matter of any one of Examples 1-5 can optionally include the visual object recognizer to direct a manipulation of the second target object to capture an image of the second target object at a location typically known to include a visual identifier.

In Example 7, the subject matter of any one of Examples 1-6 can optionally include that the visual identifier is at least one of a bar code, a quick response (QR) code, or a text-based identifier.

In Example 8, the subject matter of any one of Examples 1-7 can optionally include a network interface to obtain a uniform resource locator (URL) based on decoding the QR code, access the URL, and obtain the classifier information when the URL is accessed.

In Example 9, the subject matter of any one of Examples 1-8 can optionally include a camera to obtain the image.

Example 10 is at least one article of manufacture including machine readable instructions which, when executed, cause a machine to at least obtain a visual identifier associated with a target object, and generate a model of the target object based on mapping an image of the target object to classifier information corresponding to the visual identifier.

In Example 11, the subject matter of Example 10 can optionally include that the instructions are to cause the machine to at least attempt to identify the target object by comparing the image to a reference computer-based model, and attempt to obtain the visual identifier associated with the target object when the target object is not identified.

In Example 12, the subject matter of any one of Examples 10-11 can optionally include that the instructions are to cause the machine to at least store the model of the target object in a database.

In Example 13, the subject matter of any one of Examples 10-12 can optionally include that the machine includes the database.

In Example 14, the subject matter of any one of Examples 10-13 can optionally include that the target object is a first target object and the image is a first image and can optionally include that the instructions are to cause the machine to at least obtain a second image of a second target object, the second target object being substantially similar to the first target object without the visual identifier, and identify the second target object by processing the second image using the model.

In Example 15, the subject matter of any one of Examples 10-14 can optionally include that the instructions are to cause the machine to at least direct a manipulation of the second target object to capture an image of the second target object at a location typically known to include a visual identifier.

In Example 16, the subject matter of any one of Examples 10-15 can optionally include that the visual identifier is at least one of a bar code, a quick response (QR) code, or a text-based identifier.

In Example 17, the subject matter of any one of Examples 10-16 can optionally include that the instructions are to cause the machine to at least obtain a uniform resource locator (URL) by decoding the QR code, access the URL, and obtain the classifier information when the URL is accessed.

In Example 18, the subject matter of any one of Examples 10-17 can optionally include that the model is at least one of an appearance-based object recognition model or a feature-based object recognition model.

Example 19 is a method to perform object recognition including obtaining, by executing an instruction with a processor of a device, a visual identifier associated with a target object, and generating, by executing an instruction with the processor of the device, a model of the target object based on mapping an image of the target object to classifier information.

In Example 20, the subject matter of Example 19 can optionally include attempting to identify the target object by comparing the image to a reference computer-based model, and in response to not identifying the target object, attempting to obtain the visual identifier associated with the target object.

In Example 21, the subject matter of any one of Examples 19-20 can optionally include storing the model of the target object in a database.

In Example 22, the subject matter of any one of Examples 19-21 can optionally include that the device includes the database.

In Example 23, the subject matter of any one of Examples 19-22 can optionally include that the target object is a first target object and the image is a first image and can optionally include obtaining a second image of a second target object, the second target object being substantially similar to the first target object without the visual identifier, and identifying the second target object by processing the second image using the model.

In Example 24, the subject matter of any one of Examples 19-23 can optionally include that the visual identifier is at least one of a bar code, a quick response (QR) code, or a text-based identifier.

In Example 25, the subject matter of any one of Examples 19-24 can optionally include obtaining a uniform resource locator (URL) by decoding the QR code, accessing the URL, and in response to accessing the URL, obtaining the classifier information.

In Example 26, the subject matter of any one of Examples 19-25 can optionally include that the model is at least one of an appearance-based object recognition model or a feature-based object recognition model.

Example 27 is another apparatus to perform object recognition including first means to obtain a visual identifier associated with a target object, and second means to generate a model of the target object based on mapping an image of the target object to classifier information corresponding to the visual identifier.

In Example 28, the subject matter of Example 27 can optionally include the first means to attempt to identify the target object by comparing the image to a reference computer-based model, and attempt to obtain the visual identifier associated with the target object when the target object is not identified.

In Example 29, the subject matter of any one of Examples 27-28 can optionally include that the second means is to store the model of the target object in a database.

In Example 30, the subject matter of any one of Examples 27-29 can optionally include the database.

In Example 31, the subject matter of any one of Examples 27-30 can optionally include that the target object is a first target object and the image is a first image, further including the first means to obtain a second image of a second target object, the second target object being substantially similar to the first target object without the visual identifier, and identify the second target object by processing the second image using the model.

In Example 32, the subject matter of any one of Examples 27-31 can optionally include the first means to direct a manipulation of the second target object to capture an image of the second target object at a location typically known to include a visual identifier.

In Example 33, the subject matter of any one of Examples 27-32 can optionally include that the visual identifier is at least one of a bar code, a quick response (QR) code, or a text-based identifier.

In Example 34, the subject matter of any one of Examples 27-33 can optionally include third means to obtain a uniform resource locator (URL) based on decoding the QR code, access the URL, and obtain the classifier information when the URL is accessed.

In Example 35, the subject matter of any one of Examples 27-34 can optionally include that the model is at least one of an appearance-based object recognition model or a feature-based object recognition model.

In Example 36, the subject matter of any one of Examples 27-35 can optionally include fourth means to obtain the image.

Example 37 is yet another apparatus to perform object recognition including a memory storing instructions, and a processor to execute the instructions to cause the processor to obtain a visual identifier associated with a target object, and generate a model of the target object based on mapping an image of the target object to classifier information corresponding to the visual identifier.

In Example 38, the subject matter of Examples 37 can optionally include the processor to attempt to identify the target object by comparing the image to a reference computer-based model, and attempt to obtain the visual identifier associated with the target object when the target object is not identified.

In Example 39, the subject matter of any one of Examples 37-38 can optionally include that the processor is to store the model of the target object in a database.

In Example 40, the subject matter of any one of Examples 37-39 can optionally include the database.

In Example 41, the subject matter of any one of Examples 37-40 can optionally include that the target object is a first target object and the image is a first image, and can optionally include that the processor is to obtain a second image of a second target object, the second target object being substantially similar to the first target object without the visual identifier, and identify the second target object by processing the second image using the model.

In Example 42, the subject matter of any one of Examples 37-41 can optionally include the processor to direct a manipulation of the second target object to capture an image of the second target object at a location typically known to include a visual identifier.

In Example 43, the subject matter of any one of Examples 37-42 can optionally include that the visual identifier is at least one of a bar code, a quick response (QR) code, or a text-based identifier.

In Example 44, the subject matter of any one of Examples 37-43 can optionally include a network interface to obtain a uniform resource locator (URL) based on decoding the QR code, access the URL, and obtain the classifier information when the URL is accessed.

In Example 45, the subject matter of any one of Examples 37-44 can optionally include that the model is at least one of an appearance-based object recognition model or a feature-based object recognition model.

In Example 46, the subject matter of any one of Examples 37-45 can optionally include a camera to obtain the image.

Example 47 is a non-transitory computer readable medium comprising instructions which, when executed, cause a machine to perform the method of any one of examples 19-26.

Although certain example methods, apparatus, systems, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to perform object-recognition, the apparatus comprising:
a visual object recognizer to compare a first image of a first target object to one or more first models;
a visual identifier recognizer to utilize a uniform resource locator (URL) to obtain classifier information associated with the first target object, the URL based on a visual identifier on the first target object; and
a recognizable object model generator to generate a second model of the first target object based on the classifier information;

the visual object recognizer to:
  obtain a second image of a second target object, the second target object to be substantially similar to the first target object, the second target object to be without the visual identifier; and
  identify the second target object by comparing the second image to the second model.

2. The apparatus of claim 1, wherein the one or more first models include a reference computer-based model, the visual object recognizer to compare the first image to the reference computer-based model, and the visual identifier recognizer to request the visual identifier associated with the first target object when the first target object is not identified based on the comparison.

3. The apparatus of claim 1, wherein the recognizable object model generator is to store the second model of the first target object in a database.

4. The apparatus of claim 3, further including the database.

5. The apparatus of claim 1, wherein the visual object recognizer is to direct a manipulation of the second target object to capture a portion of the second target object in the second image, the portion to include the visual identifier.

6. The apparatus of claim 1, wherein the visual identifier is at least one of a bar code, a quick response (QR) code, or a text-based identifier.

7. The apparatus of claim 1, wherein the visual identifier is a quick response (QR) code, and further including a network interface to obtain the URL based on decoding the QR code, the visual identifier recognizer to access the URL via the network interface, and the network interface to obtain the classifier information when the URL is accessed.

8. The apparatus of claim 1, further including a camera to obtain at least one of the first image or the second image.

9. A non-transitory computer readable storage medium comprising instructions which, when executed, cause a machine to at least:
  compare a first image of a first target object to one or more first models;
  obtain classifier information associated with the first target object via a uniform resource locator (URL), the URL based on a visual identifier on the first target object;
  generate a second model of the first target object based on the classifier information;
  obtain a second image of a second target object, the second target object substantially similar to the first target object, the second target object to be without the visual identifier; and
  identify the second target object by processing the second image using the second model.

10. The non-transitory computer readable storage medium of claim 9, wherein the one or more first models include a reference computer-based model, and the instructions, when executed, cause the machine to at least:
  compare the first image to the reference computer-based model; and
  request the visual identifier associated with the first target object when the first target object is not identified based on the comparison.

11. The non-transitory computer readable storage medium of claim 9, wherein the instructions, when executed, cause the machine to at least store the second model of the first target object in a database.

12. The non-transitory computer readable storage medium of claim 11, wherein the non-transitory computer readable storage medium includes the database.

13. The non-transitory computer readable storage medium of claim 9, wherein the visual identifier is at least one of a bar code, a quick response (QR) code, or a text-based identifier.

14. The non-transitory computer readable storage medium of claim 9, wherein the visual identifier is a quick response (QR) code, and the instructions, when executed, cause the machine to at least: (a) obtain the URL by decoding the QR code, and (b) obtain the classifier information when the URL is accessed.

15. The non-transitory computer readable storage medium of claim 9, wherein the second model is at least one of an appearance-based object recognition model or a feature-based object recognition model.

16. A method to perform object-recognition, the method comprising:
  comparing, by executing an instruction with a processor of a device, a first image of a first target object to one or more first models;
  obtaining, by executing an instruction with the processor of the device, classifier information associated with the first target object via a uniform resource locator (URL), the URL based on a visual identifier on the first target object; and
  generating, by executing an instruction with the processor of the device, a second model of the first target object based on the classifier information;
  obtaining a second image of a second target object, the second target object substantially similar to the first target object, the second target object to be without the visual identifier; and
  identifying the second target object based on a comparison of the second image to the second model.

17. The method of claim 16, wherein the one or more first models include a reference computer-based model, and further including:
  comparing the first image to the reference computer-based model; and
  in response to not identifying the first target object based on the comparison, requesting the visual identifier associated with the first target object.

18. The non-transitory computer readable storage medium of claim 9, wherein the instructions, when executed, cause the machine to direct a manipulation of the second target object to capture a portion of the second target object in the second image, the portion to include the visual identifier.

19. The method of claim 16, further including directing a manipulation of the second target object to capture a portion of the second target object in the second image, the portion to include the visual identifier.

20. An apparatus to perform object-recognition, the apparatus comprising:
  a visual object recognizer to:
    compare a first image of a first target object to one or more first models;
    direct a manipulation of a second target object to capture a portion of the second target object in a second image, the second target object to be substantially similar to the first target object, the second target object to be without a visual identifier, the portion to include the visual identifier; and
    identify the second target object by comparing the second image to a second model of the first target object;
  a visual identifier recognizer to obtain classifier information associated with the first target object based on a uniform resource locator (URL), the URL based on the visual identifier on the first target object; and a recognizable object model generator to generate the second model based on the classifier information.

\* \* \* \* \*